US012662426B2

(12) United States Patent (10) Patent No.: US 12,662,426 B2
Bannwarth (45) Date of Patent: Jun. 23, 2026

(54) PROCESS FOR PREPARING WATER-REDISPERSIBLE POLYMER POWDERS FOR DRY FORMULATIONS OF CONSTRUCTION MATERIALS

(71) Applicant: Wacker Chemie AG, Munich (DE)

(72) Inventor: Markus Bannwarth, Burghausen (DE)

(73) Assignee: Wacker Chemie AG, Munich (DE)

( * ) Notice: Subject to any disclaimer, the term of this patent is extended or adjusted under 35 U.S.C. 154(b) by 548 days.

(21) Appl. No.: 17/925,834

(22) PCT Filed: May 28, 2020

(86) PCT No.: PCT/EP2020/064865
§ 371 (c)(1),
(2) Date: Nov. 17, 2022

(87) PCT Pub. No.: WO2021/239234
PCT Pub. Date: Dec. 2, 2021

(65) Prior Publication Data
US 2023/0183134 A1 Jun. 15, 2023

(51) Int. Cl.
*C04B 24/26* (2006.01)
*C04B 22/14* (2006.01)
*C04B 40/00* (2006.01)
C04B 103/00 (2006.01)

(52) U.S. Cl.
CPC ........ *C04B 24/2623* (2013.01); *C04B 22/147* (2013.01); *C04B 24/2641* (2013.01); *C04B 40/0042* (2013.01); *C04B 2103/0057* (2013.01); *C04B 2103/0065* (2013.01)

(58) Field of Classification Search
CPC .............. C04B 24/2623; C04B 22/147; C04B 24/2641; C04B 40/0042; C04B 2103/0057; C04B 2103/0065; C04B 2111/00517; C04B 2111/00637; C04B 2111/28; C04B 2111/60; C04B 2111/62; C04B 28/04; C04B 28/06; Y02W 30/91
See application file for complete search history.

(56) References Cited

U.S. PATENT DOCUMENTS

| | | | |
|---|---|---|---|
| 8,349,960 B2 * | 1/2013 | Gaeberlein | ............. C04B 28/02 524/502 |
| 9,522,845 B2 * | 12/2016 | Herold | ................... C04B 28/02 |

FOREIGN PATENT DOCUMENTS

| | | | | |
|---|---|---|---|---|
| CN | 103497290 | A | 1/2014 | |
| DE | 1771962 | A1 | 2/1972 | |
| DE | 2312408 | A1 | 9/1973 | |
| EP | 0078449 | A2 | 5/1983 | |
| EP | 0770640 | A2 | 5/1997 | |
| EP | 0989154 | A2 | 3/2000 | |
| EP | 1065226 | A1 | 1/2001 | |
| EP | 1615861 | A1 | 1/2006 | |
| EP | 1897926 | A1 * | 3/2008 | ........... C09J 201/00 |
| EP | 3230394 | A1 | 10/2017 | |
| GB | 929704 | A | 6/1963 | |
| WO | 2004092094 | A1 | 10/2004 | |
| WO | 2010055038 | A1 | 5/2010 | |
| WO | 2017178422 | A1 | 10/2017 | |

OTHER PUBLICATIONS

Fox T. G., Bull. Am. Physics Soc., vol. 1, No. 3, p. 123, 1956.
Schulze J., Tiz, No. 9, 1985.
Polymer Handbook 2nd Edition, J. Wiley & Sons, New York (1975).

* cited by examiner

*Primary Examiner* — Anastasia A. Kuvayskaya

(57) ABSTRACT

Vinyl acetate-ethylene and/or styrene-(meth)acrylic ester copolymers along with processes for preparing the same and uses for the same. Wherein the vinyl acetate-ethylene and/or styrene-(meth)acrylic ester copolymers are in the form of water-redispersible powders for producing hydraulically-setting building material dry formulations. Where the storage stability of the protective-colloid-stabilized vinyl acetate-ethylene or styrene-(meth)acrylic ester copolymers in the form of water-redispersible powders is improved by drying aqueous dispersions comprising protective-colloid-stabilized vinyl acetate-ethylene and/or styrene-(meth) acrylic ester copolymers, one or more water-soluble inorganic salts, and one or more desiccants. Where the water-soluble inorganic salts are selected from the group consisting of alkali metal sulfates and where the desiccants are selected from the group comprising polyvinyl alcohols, polyvinyl acetals, nonionic polyvinylpyrrolidones, nonionic poly(meth)acrylamides, polysaccharides and proteins.

16 Claims, No Drawings

PROCESS FOR PREPARING WATER-REDISPERSIBLE POLYMER POWDERS FOR DRY FORMULATIONS OF CONSTRUCTION MATERIALS

CROSS-REFERENCE TO RELATED APPLICATIONS

This application is a U.S. National Phase application of PCT Application NO. PCT/EP2020/064865 filed on May 28, 2020, which is incorporated by reference herein in its entirety.

The invention relates to processes for producing vinyl acetate-ethylene and/or styrene-(meth)acrylic ester copolymers in the form of water-redispersible powders for building material dry formulations such as tile adhesives, sealing slurries, self-leveling compounds or reinforcing compounds.

Building material dry formulations normally comprise hydraulically-setting binders, such as cement, as well as fillers, polymers in the form of water-redispersible powders (polymer powders), and optionally further additives, as described for example in GB1771962, and are used for example as tile adhesives, joint fillers, spackling compounds, sealing slurries, plasters or screeds. The building material dry formulations are mixed with water before they are applied, thereby converting them into fresh mortar, i.e. into their ready-to-use form.

Polymers in the form of water-redispersible powders refer, as is known, to powder compositions obtainable through drying the corresponding aqueous polymer dispersions in the presence of desiccants. This production process results in the finely divided polymer resin of the dispersion becoming coated with usually water-soluble desiccants. During drying, the desiccant acts like a coat that prevents the particles from sticking together irreversibly. On redispersing the polymer powder in water, the desiccant dissolves and an aqueous redispersion forms in which the original polymer particles (primary polymer particles) are as far as possible present once again (Schulze J. in TIZ, No. 9, 1985).

With polymer powders it is possible for example to improve the cohesive or adhesive properties of hardened building products, especially mechanical strengths, such as (flexural) tensile strengths, or the adhesion of the building material products to substrates, for example to mineral substrates or insulating materials such as polystyrene panels. For this, it is necessary for the polymers in the application to undergo film formation with one other and with the fillers and inorganic binders. In order to achieve homogeneous film formation of the polymers in the building material products, the polymer powders need to be redispersed as completely as possible when water is added and in as finely divided a form as possible. If this is not the case, the polymer powders will be present in the building material products as merely coarse organic fillers.

The complete redispersion of polymer powders in water is however a challenge and causes problems, especially after polymer powders have been stored for longer periods or after storage at relatively high temperatures or relatively high humidity, i.e. after storage in humid, warm, or even warm and humid conditions, such as tropical conditions. However, problems with redispersion can occur even after storage in temperate climatic zones, for example when the prevailing conditions are humid and/or warm and humid during seasonal changes or the polymer powders are stored for relatively long periods. During storage, the polymer powders should undergo as little film formation/blocking with one another as possible; any adverse effect on their flowability should be as minimal as possible and addition of water should result in the release once again of the primary polymer particles from the polymer powders. All these problems are particularly pronounced in the case of soft polymers such as vinyl acetate-ethylene copolymers or corresponding styrene-(meth)acrylic ester copolymers. Such copolymers generally have low glass transition temperatures and undergo film formation particularly efficiently at the application temperature. However, the low glass transition temperatures, which are usually below the customary storage temperatures, mean that such copolymers also tend to already undergo increased film formation/blocking while still in powder form. In such cases, the provision of polymer powders that are completely redispersible in water poses a particular challenge.

A wide variety of approaches have been employed in recent decades in order to improve the redispersibility of polymer powders. For example, EP 0770640 teaches the addition of polyelectrolytes as desiccants. EP1065226 relates to emulsifier-stabilized, protective colloid-free redispersible powders based on vinylaromatic copolymers. DE2312408 concerns emulsifier-stabilized polymer powders of base polymers containing carboxylic acid units, which before drying are treated with six-membered carbocyclic compounds having two vicinal carboxyl substituents and adjusted to an alkaline pH. However, such additives influence the setting behavior of hydraulically-setting binders and are therefore proscribed for the modification of generally employable polymer powders for building material formulations. The polymers of DE 2312408 are redispersible in water even after film formation. To improve the redispersibility of styrene-butadiene or acrylonitrile-butadiene copolymers, EP0989154 teaches the incorporation by polymerization of carboxylic acid monomers into the base polymers and the addition of alkali metal salts of N-alkylsulfosuccinamate-maleic acid copolymers as desiccants. The polymer powders were modified with the antiblocking agents chalk, talc, diatomaceous earth, kaolin, silicates, silica or calcium carbonate, which are known to be insoluble in water. For polymers with low softening points, EP0078449 recommends the use as desiccants of vinylpyrrolidone-vinyl acetate polymers or alkali metal or alkaline earth metal salts of naphthalenesulfonic acid-formaldehyde condensates. The aim of EP3230394 was to provide aqueous polymer dispersions and aqueous adhesive formulations that should not undergo any significant change in their viscosity on storage. For this purpose, it is for EP3230394 essential to add to the polymer dispersions polyfunctional alcohols and additionally organic or inorganic salts of alkali metals or alkaline earth metals, in particular lithium chloride. The adhesives serve in particular as wood glue or paper adhesives or for bonding other packaging materials. Polyfunctional alcohols are however known to retard the setting of hydraulically-setting binders. EP1615861 seeks to provide mortars having accelerated setting and teaches for this purpose the addition of polymer powder compositions modified with alkali metal or alkaline earth metal salts of inorganic or organic acids. EP 1897926 is concerned with aqueous or water-redispersible adhesives that comprise water-insoluble and/or water-soluble polymers and polyalkylene polyamines and optionally water-soluble salts for non-cementitious uses, for example for bonding paper or cardboard, for producing nonwovens or for bonding cigarette paper, especially for mechanical nozzle application. GB929704 describes polymer powders based on acrylates or polyvinyl acetates having the aim of increasing throughput in spray dryers by increasing the spray temperature and also of improving the storage stability of polymer powders. Polyvinyl acetates are known to be hard polymers and have a glass transition temperature of over 30° C. For this purpose GB1771962 recommends adding to the spray feeds either inert solids, hydrophilic colloids or soluble salts, or combinations of inert solids and hydrophilic colloids or inert solids and soluble salts. WO2017/178422 teaches processes in which water-soluble salts of multivalent metals, such as alkaline earth metals, aluminum, zirconium, iron or zinc, and additionally water-soluble salts of aluminates, silicates, borates, sulfates or carbonates are introduced into aqueous polymer dispersions and then dried, wherein the various inorganic salts form a dense shell on the polymer particles that breaks up only in alkaline media or as a result of mechanical stress.

The polymerization of ethylenically unsaturated monomers is normally initiated by means of initiators, including for example alkali metal persulfates. As is known, the initiators decompose into free radicals that add to ethylenically unsaturated monomers, thereby initiating polymer chain growth. As a result, the initiators are attached via covalent bonds to the polymers formed in the course of the polymerization and are thus not present in the polymer dispersion in the form of low-molecular-weight compounds such as alkali metal sulfates.

Against this background, an object was to provide vinyl acetate-ethylene and/or styrene-(meth)acrylic ester copolymers for building material dry formulations in the form of water-redispersible powders having improved storage stability, preferably even after storage of the polymer powders in humid, warm, or warm and humid conditions. The polymer powders should here preferably be free of additives that strongly influence the setting of fresh mortars.

Surprisingly, the object was achieved by producing the polymer powders through drying aqueous dispersions of ethylene-vinyl acetate and/or styrene-(meth)acrylic ester copolymers comprising water-soluble inorganic salts selected from the group consisting of alkali metal sulfates and magnesium sulfate ($MgSO_4$).

The invention provides processes for producing vinyl acetate-ethylene and/or styrene-(meth)acrylic ester copolymers in the form of water-redispersible powders for building material dry formulations, characterized in that the storage stability of the protective-colloid-stabilized vinyl acetate-ethylene and/or styrene-(meth)acrylic ester copolymers in the form of water-redispersible powders is improved by drying aqueous dispersions comprising protective-colloid-stabilized vinyl acetate-ethylene and/or styrene-(meth)acrylic ester copolymers, one or more water-soluble inorganic salts, and one or more desiccants, the water-soluble inorganic salts being selected from the group consisting of alkali metal sulfates and magnesium sulfate ($MgSO_4$), and the desiccants being selected from the group comprising polyvinyl alcohols, polyvinyl acetals, nonionic polyvinylpyrrolidones, nonionic poly(meth)acrylamides, polysaccharides, and proteins.

The protective-colloid-stabilized vinyl acetate-ethylene and/or styrene-(meth)acrylic ester copolymers in the form of water-redispersible powders that are produced according to the invention are hereinbelow also referred to for short as polymer powders. The vinyl acetate-ethylene and/or styrene-(meth)acrylic ester copolymers are hereinbelow also referred to for short as copolymers.

The water-soluble inorganic salts have a solubility in water of preferably ≥1 g per liter of water, more preferably ≥3 g per liter of water, and most preferably ≥10 g per liter of water, in each case under standard conditions (23/50) as per DIN50014. These values relate preferably to neutral pH values.

Examples of alkali sulfates are lithium sulfate ($Li_2SO_4$), sodium sulfate ($Na_2SO_4$), and potassium sulfate ($K_2SO_4$). Preference is given to sodium sulfate and potassium sulfate. Most preferred is sodium sulfate.

The aqueous dispersions and/or the polymer powders contain preferably 0.1% to 20% by weight, more preferably 0.3% to 10% by weight, even more preferably 0.5% to 5% by weight, particularly preferably 0.8% to 4%, and most preferably 1% to 3% by weight, of water-soluble inorganic salts, based on the total weight of the copolymers.

The desiccants are generally polyvinyl alcohols, polyvinyl acetals, nonionic polyvinylpyrrolidones, nonionic poly(meth)acrylamides, polysaccharides, and proteins. The desiccants mentioned are obtainable by processes known to those skilled in the art. Preference is given to nonionic desiccants. The nonionic desiccants, nonionic polyvinylpyrrolidones, and nonionic poly(meth)acrylamides generally do not contain any ionic monomer units and generally do not bear any ionic groups, especially no ammonium, carboxylic acid or sulfonic acid groups. The nonionic polyvinylpyrrolidones consist preferably of vinylpyrrolidone units. The nonionic poly(meth)acrylamides consist preferably of (meth)acrylamide units.

Preference as desiccants is given to polyvinyl alcohols, polyvinyl acetals; polysaccharides, especially in water-soluble form such as starches (amylose and amylopectin), celluloses or derivatives thereof such as carboxymethyl, methyl, hydroxyethyl or hydroxypropyl derivatives; and proteins such as casein or caseinate, soy protein, and gelatin. Particular preference is given to polyvinyl alcohols. Most preferably, no further desiccants besides polyvinyl alcohols are used.

Polyvinyl alcohols may be partially hydrolyzed or fully hydrolyzed polyvinyl alcohols, for example having a degree of hydrolysis of from 80 to 100 mol %, especially partially hydrolyzed polyvinyl alcohols having a degree of hydrolysis of from 80 to 95 mol %, preferably 85 to 92 mol %. The polyvinyl alcohols have a Höppler viscosity in a 4% aqueous solution of preferably 1 to 30 mPas (Höppler method at 20° C., DIN 53015). Preference is also given to partially hydrolyzed, hydrophobically modified polyvinyl alcohols, especially having a degree of hydrolysis of 80 to 95 mol % and a Höppler viscosity in a 4% aqueous solution of preferably 1 to 30 mPas. Examples of these include partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates, such as diisopropyl maleate and diisopropyl fumarate, vinyl chloride, vinyl alkyl ethers such as vinyl butyl ether, and olefins such as ethene and decene. The proportion of the hydrophobic units is preferably 0.1% to 10% by weight based on the total weight of the partially hydrolyzed polyvinyl alcohol. Mixtures of the polyvinyl alcohols mentioned may also be used.

Most preferred are polyvinyl alcohols having a degree of hydrolysis of 85 to 94 mol % and a Höppler viscosity in a 4% aqueous solution of 3 to 15 mPas (Höppler method at 20° C., DIN 53015).

The aqueous dispersions and/or the polymer powders contain preferably 1% to 30% by weight, more preferably 2% to 20% by weight, and most preferably 3% to 15% by weight, of desiccants, based on the total weight of the copolymers.

Besides vinyl acetate and ethylene, the vinyl acetate-ethylene copolymers may be based on one or more further monomers, for example selected from the group comprising vinyl esters of carboxylic acids having 3 to 15 carbon atoms, methacrylic esters or acrylic esters of carboxylic acids with unbranched or branched alcohols having 1 to 15 carbon atoms, propylene, dienes, vinylaromatics, and vinyl halides.

Preferred vinyl esters of carboxylic acids having 3 to 15 carbon atoms are vinyl propionate, vinyl butyrate, vinyl 2-ethylhexanoate, vinyl laurate, 1-methylvinyl acetate, vinyl pivalate, and vinyl esters of alpha-branched monocarboxylic acids having 5 to 13 carbon atoms, for example VeoVa9R or VeoVa10R (trade names of Shell).

Preferred methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Particular preference is given to methyl acrylate, methyl methacrylate, n-butyl acrylate, and 2-ethylhexyl acrylate.

Preferred diene is 1,3-butadiene. Preferred vinylaromatics are styrene and vinyltoluene. A preferred vinyl halide is vinyl chloride.

The (meth)acrylic ester monomer units of the styrene-(meth)acrylic ester copolymers are for example methacrylic esters or acrylic esters of carboxylic acids with unbranched or branched alcohols having 1 to 15 carbon atoms. Preference and particular preference here is given to the methacrylic esters or acrylic esters mentioned hereinabove.

In addition to styrene and (meth)acrylic esters, the styrene-(meth)acrylic ester copolymers may be based on one or more further monomers selected for example from the group comprising vinyl esters of carboxylic acids having 2 to 15 carbon atoms, olefins and dienes, vinyltoluene, and vinyl halides. Preference here is given to the abovementioned vinyl esters of carboxylic acids having 3 to 15 carbon atoms, dienes, vinyl halides and vinyl acetate, ethene, and propylene.

Optionally, one or more auxiliary monomers may be incorporated by polymerization into the vinyl acetate-ethylene and/or styrene-(meth)acrylic ester copolymers. Preferably, up to 20% by weight, more preferably 0.1% to 10% by weight, based on the total weight of the copolymers, of auxiliary monomers is incorporated by polymerization into the copolymers. Examples of auxiliary monomers are ethylenically unsaturated mono- and dicarboxylic acids, preferably acrylic acid, methacrylic acid, fumaric acid, and maleic acid; ethylenically unsaturated carboxylic acid amides and carboxylic acid nitriles, preferably acrylamide and acrylonitrile; mono- and diesters of fumaric acid and maleic acid, such as the diethyl and diisopropyl esters, and also maleic anhydride, ethylenically unsaturated sulfonic acids or salts thereof, preferably vinylsulfonic acid and 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MMAG), N-methylolacrylamide (NMA), N-methylolmethacrylamide (NMMA), N-methylol allyl carbamate, alkyl ethers such as the isobutoxy ether or ester of N-methylol acrylamide, of N-methylol methacrylamide, and of N-methylol allyl carbamate. Also suitable are epoxy-functional comonomers such as glycidyl methacrylate and glycidyl acrylate. Further examples are silicon-functional comonomers, such as acryloyloxypropyltrialkoxy- and methacryloyloxypropyltrialkoxysilanes, vinyltrialkoxysilanes, and vinylmethyldialkoxysilanes, where it is possible for the alkoxy groups to be present for example in the form of methoxy radicals, ethoxy radicals, and ethoxypropylene glycol ether radicals. Mention should also be made of monomers having hydroxy or CO groups, for example hydroxyalkyl methacrylates and acrylates such as hydroxyethyl, hydroxypropyl or hydroxybutyl acrylate or methacrylate, and also compounds such as diacetone acrylamide and acetylacetoxyethyl acrylate or methacrylate. Further examples also include vinyl ethers such as methyl, ethyl, or isobutyl vinyl ether.

In an alternative, preferred embodiment, no ethylenically unsaturated mono- and dicarboxylic acids, no mono- and diesters of fumaric acid and maleic acid, no maleic anhydride and/or no ethylenically unsaturated sulfonic acids are incorporated by polymerization into the copolymers. Particularly preferably, no auxiliary monomers are incorporated by polymerization into the copolymers.

Preference is given to vinyl acetate-ethylene copolymers.

Examples of suitable copolymers are copolymers of vinyl acetate with ethylene, copolymers of vinyl acetate with ethylene and one or more further vinyl esters other than vinyl acetate, copolymers of vinyl acetate with ethylene and acrylic esters, copolymers of vinyl acetate with ethylene and vinyl chloride, and styrene-(meth)acrylic ester copolymers.

Preference is given to copolymers of vinyl acetate with 1% to 40% by weight of ethylene; copolymers of vinyl acetate with 1% to 40% by weight of ethylene and 1% to 50% by weight of one or more further comonomers from the group of vinyl esters having 3 to 12 carbon atoms in the carboxyl radical, such as vinyl propionate, vinyl laurate, vinyl esters of alpha-branched carboxylic acids having 5 to 13 carbon atoms, such as VeoVa9R, VeoVa10R, VeoVa11R; copolymers of vinyl acetate, 1% to 40% by weight of ethylene, and preferably 1% to 60% by weight of acrylic esters of unbranched or branched alcohols having 1 to 15 carbon atoms, especially n-butyl acrylate or 2-ethylhexyl acrylate; and copolymers with 30% to 75% by weight of vinyl acetate, 1% to 40% by weight of ethylene, 1% to 30% by weight of vinyl laurate or vinyl esters of an alpha-branched carboxylic acid having 5 to 13 carbon atoms, and also 1% to 30% by weight of acrylic esters of unbranched or branched alcohols having 1 to 15 carbon atoms, especially n-butyl acrylate or 2-ethylhexyl acrylate; copolymers with vinyl acetate, 1% to 40% by weight of ethylene, and 1% to 60% by weight of vinyl chloride; wherein the copolymers may each additionally contain the auxiliary monomers mentioned, preferably in the amounts mentioned, and the percentages by weight add up to 100% by weight in each case.

Preference is also given to styrene-(meth)acrylic ester copolymers of styrene with one or more monomers from the group comprising methyl methacrylate, methyl acrylate, ethyl acrylate, propyl acrylate, n-butyl acrylate, 2-ethylhexyl acrylate; wherein the copolymers may each additionally contain the auxiliary monomers mentioned, preferably in the amounts mentioned, and the percentages by weight add up to 100% by weight in each case.

The monomer selection and selection of the proportions by weight of the comonomers is made so as to generally result in a glass transition temperature Tg of −50° C. to +25° C., preferably −30° C. to +20° C. The glass transition temperature Tg of the polymers can be determined in a known manner by differential scanning calorimetry (DSC). An approximate Tg can also be precalculated by means of the Fox equation. According to Fox T. G., Bull. Am. Physics Soc. 1, 3, page 123 (1956): $1/Tg=x_1/Tg_1+x_2/Tg_2+ \ldots +x_n/Tg_n$, where $x_n$ is the mass fraction (% by weight/100) of the monomer n, and $Tg_n$ is the glass transition temperature in kelvins of the homopolymer of the monomer n. Tg values for homopolymers are listed in Polymer Handbook 2nd Edition, J. Wiley & Sons, New York (1975).

The polymer powders preferably contain 50% to 90% by weight of vinyl acetate-ethylene and/or styrene-(meth) acrylic ester copolymers, based on the total weight of the polymer powder.

Examples of protective colloids are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, and hydroxypropyl derivatives thereof, dextrins and cyclodextrins; proteins such as casein or caseinate, soy protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine-formaldehyde sulfonates, naphthalene-formaldehyde sulfonates, styrene-maleic acid copolymers, and vinyl ether-maleic acid copolymers.

Preference, more preference, and most preference as protective colloids is given to the same embodiments as those listed for the desiccants. Most preferably, exclusively polyvinyl alcohols are used as protective colloids. Most preferably too, the protective colloids and the desiccants are identical.

The polymer powders contain preferably 1% to 20% by weight, more preferably 2% to 15% by weight, of protective colloids, based on the total weight of the polymer powder.

The copolymers are preferably produced by the emulsion polymerization process. The emulsion polymerization is normally effected in an aqueous medium. The polymerization temperature is generally 40° C. to 100° C., preferably 60° C. to 95° C. The copolymerization of gaseous monomers such as ethylene, 1,3-butadiene or vinyl chloride may also be operated under pressure, generally between 5 bar and 100 bar.

The polymerization may be initiated using the redox initiator combinations commonly used for emulsion polymerization. The monomer conversion may be controlled in the usual manner through metering in the initiator. The initiators are generally metered in overall in such a way that continuous polymerization is ensured. Examples of suitable oxidation initiators include the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, and azobisisobutyronitrile. Preference is given to the sodium, potassium and ammonium salts of peroxodisulfuric acid and to hydrogen peroxide. The initiators mentioned are generally used in an amount of 0.01% to 2.0% by weight based on the total weight of the monomers.

Examples of suitable reducing agents are the sulfites and bisulfites of alkali metals and ammonium, such as sodium sulfite, derivatives of sulfoxylic acid, such as zinc or alkali metal formaldehyde sulfoxylates, for example sodium hydroxymethanesulfinate (Bruggolite), and (iso)ascorbic acid. Preference is given to sodium hydroxymethanesulfinate and (iso)ascorbic acid. The amount of reducing agent is preferably 0.015% to 3% by weight based on the total weight of the monomers.

The oxidizing agents mentioned, in particular the salts of peroxodisulfuric acid and also hydrogen peroxide, may also be used as thermal initiators on their own.

Substances that act as chain-transfer agents may be used during the emulsion polymerization process to control the molecular weight. Where chain-transfer agents are used, they are typically used in amounts of between 0.001% to 5.0% by weight based on the monomers to be polymerized, and are added separately or else as premixes with the reaction components. Examples of such substances are n-dodecyl mercaptan, tert-dodecyl mercaptan, mercaptopropionic acids or alkali metal salts thereof, methyl mercaptopropionate, isopropanol, phosphonic acid or derivatives thereof, phosphinic acid or derivatives thereof, and acetaldehyde. Preference is given to using 2-mercaptopropionic acid or tert-dodecyl mercaptan.

For stabilization it is possible to use protective colloids, optionally in combination with emulsifiers. In the emulsion polymerization process, polymerization can also be carried out in the presence of emulsifiers. Preferred amounts of emulsifiers are 1% to 7% by weight based on the total weight of the monomers. Examples of emulsifiers are anionic, cationic or nonionic emulsifiers, such as anionic surfactants, especially alkyl sulfates having a chain length of 8 to 18 carbon atoms, alkyl or alkylaryl ether sulfates having 8 to 18 carbon atoms in the hydrophobic residue and up to 40 ethylene oxide or propylene oxide units, alkyl- or alkylaryl sulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

Polymerization is particularly preferably carried out in the absence of emulsifiers. The aqueous dispersions and/or the polymer powders preferably contain no emulsifiers.

At the end of the polymerization, residual monomers may be removed by postpolymerization employing known methods, for example by redox catalyst-initiated postpolymerization. Volatile residual monomers can also be removed by distillation, preferably under reduced pressure, and optionally while passing inert entraining gases, such as air, nitrogen or water vapor, through or over the mixture.

The copolymers obtainable in this way are preferably present in the form of protective-colloid-stabilized aqueous dispersions.

The aqueous dispersions have a solids content of preferably 30% to 75% by weight, more preferably 45% to 60% by weight.

The addition of the water-soluble inorganic salts can take place before, during or preferably after production of the copolymers by polymerization. It is also possible to use chemical substances that are converted into water-soluble inorganic salts by chemical reaction.

For example, the water-soluble inorganic salts may be mixed with the ethylenically unsaturated monomers before initiation of the polymerization. Alternatively, the water-soluble inorganic salts may be added during the polymerization of the ethylenically unsaturated monomers. Likewise, a portion of the water-soluble inorganic salts may be admixed with the ethylenically unsaturated monomers before initiation of the polymerization and the remaining portion of the water-soluble inorganic salts added during the polymerization of the ethylenically unsaturated monomers.

Preferably, the addition of the water-soluble inorganic salts to the corresponding polymer dispersion takes place at the end of the polymerization. Particularly preferably, the addition of the water-soluble inorganic salts takes place before the drying of the aqueous polymer dispersion. For this, preferably one or more water-soluble inorganic salts are added to the aqueous polymer dispersions in order to then dry the resulting mixtures. Preferably, no water-soluble inorganic salts are added during the drying of the aqueous polymer dispersions.

Desiccants are generally added to the aqueous dispersions thus obtained. As a rule, the desiccant is used in a total amount of 0.5% to 30% by weight, especially 5% to 20% by weight, based on the solids content of the aqueous dispersion. The total amount of desiccant and protective colloid before the drying process is preferably 1% to 30% by weight based on the solids content of the aqueous dispersion. The addition of the desiccants to the aqueous dispersions is not tied to any particular procedure and can take place in a conventional manner.

The aqueous dispersions may be dried for example by fluidized-bed drying, freeze drying or spray drying. Preference is given to spray drying the dispersions. The spray drying is effected in standard spray-drying systems, wherein atomization may be effected by means of one-, two- or multiphase nozzles or with a rotating disk. The chosen exit temperature is generally within a range from 45° C. to 120° C., preferably 60° C. to 90° C., depending on the system, Tg of the resin, and desired degree of drying. The viscosity of the feed to be atomized is adjusted via the solids content such that a value of <500 mPas (Brookfield viscosity at 20 revolutions and 23° C.), preferably <250 mPas, is obtained. The solids content of the dispersion to be atomized is preferably from 30% to 75% by weight and more preferably from 50% to 60% by weight.

A content of up to 1.5% by weight of defoamer, based on the polymer, has proven advantageous in many cases. Defoamer is preferably added during atomization.

To increase the storage stability by improving the blocking stability, particularly in the case of polymer powders having a low glass transition temperature, the polymer powder obtained may be provided for example with one or more antiblocking agents (anticaking agents). The antiblocking agents are preferably added not to the aqueous polymer dispersions, i.e. preferably not before drying, but preferably during or after drying, especially during drying in the spray-drying system. Preferred polymer powders comprise antiblocking agents, especially 1% to 30% by weight based on the total weight of polymeric constituents. Examples of antiblocking agents are calcium carbonate or magnesium carbonate, talc, gypsum, silica, kaolins such as metakaolin, and silicates, preferably having particle sizes within a range from 10 nm to 10 μm. Antiblocking agents are usually water-insoluble.

The polymer powders preferably contain no polyelectrolytes. Polyelectrolytes generally refer to polymers having groups that can dissociate into ions in an aqueous medium and that may be a constituent or substituent of the polymer chain. The number of groups that can dissociate into ions is generally so large that the polymers are in the dissociated form completely soluble in water. Polyelectrolytes may be for example polyacids or polybases.

The polymer powders preferably contain no water-soluble halide salts, especially no water-soluble chloride salts. Water-soluble halide salts have a water solubility of preferably ≥1 g per liter of water under standard conditions (23/50) as per DIN50014.

The polymer powders preferably contain no polyfunctional alcohols, especially no alcohols bearing at least one alcohol group and optionally one or more further functional groups selected from the group comprising amino, carbamic acid, mercaptan, sulfonic acid, sulfuric acid, halide, carboxyl, alkoxy, phosphinic acid, phosphonic acid, and phosphoric acid groups, where the sum of the number of alcohol groups and of the further functional groups of the alcohols is ≥2. The polymer powders preferably contain no alcohols having ≤20, more preferably ≤15 carbon atoms or >2 carbon atoms.

The polymer powders preferably contain no polyalkylene polyamines, especially no polyethyleneimine, especially none having a molecular weight of 300 to 10 000 000.

Polyalkylene polyamines are generally based on ethylenically unsaturated monomers bearing amine, ammonium or amide groups and optionally on further ethylenically unsaturated monomers.

The building material dry formulations contain preferably 0.1% to 30% by weight, more preferably 0.3% to 12.0% by weight, and most preferably 0.5% to 5.0% by weight, of polymer powders, in each case based on the total weight of the building material dry formulations.

The invention further provides for the use of vinyl acetate-ethylene and/or styrene-(meth)acrylic ester copolymers, in the form of water-redispersible powders, for producing building material dry formulations, characterized in that the storage stability of the protective-colloid-stabilized vinyl acetate-ethylene and/or styrene-(meth)acrylic ester copolymers in the form of water-redispersible powders is improved by drying aqueous dispersions comprising protective-colloid-stabilized vinyl acetate-ethylene and/or styrene-(meth)acrylic ester copolymers, one or more water-soluble inorganic salts, and one or more desiccants, the water-soluble inorganic salts being selected from the group consisting of alkali metal sulfates and magnesium sulfate ($MgSO_4$), and the desiccants being selected from the group comprising polyvinyl alcohols, polyvinyl acetals, nonionic polyvinylpyrrolidones, nonionic poly(meth)acrylamides, polysaccharides, and proteins.

Examples of suitable hydraulically-setting binders are cements, especially portland cement, aluminate cement, trass cement, slag cement, magnesia cement, phosphate cement or blast furnace cement, and also mixed cements, filling cements, fly ash, microsilica, hydraulic lime, and gypsum. Preference is given to portland cement, aluminate cements, and slag cement and also to mixed cements, filling cements, hydraulic lime, and gypsum. Preference is given also to mixtures of two or more hydraulically-setting binders comprising in particular cement and hydraulic lime.

In general, the building material dry formulations contain 5% to 50% by weight, preferably 10% to 30% by weight, of hydraulically-setting binders, in each case based on the total weight of the building material dry formulations.

Examples of suitable fillers are quartz sand, quartz powder, calcium carbonate, dolomite, aluminum silicates, clay, chalk, white hydrated lime, talc or mica, or also lightweight fillers such as pumice, foam glass, aerated concrete, perlite, vermiculite, and carbon nanotubes (CNT). Any desired mixtures of the recited fillers may also be used. Preference is given to quartz sand, quartz powder, calcium carbonate, chalk or hydrated white lime.

Fillers are generally/implicitly insoluble in water.

In general, the building material dry formulations contain 30% to 90% by weight, preferably 40% to 85% by weight, of fillers, in each case based on the total weight of the building material dry formulations.

Other customary additives for the building material dry formulations are thickeners, for example polysaccharides, such as cellulose ethers and modified cellulose ethers, starch ethers, guar gum, xanthan gum, phyllosilicates, polycarboxylic acids, such as polyacrylic acid and partial esters thereof, and also polyvinyl alcohols, which may optionally be acetalized or hydrophobically modified, casein, and associative thickeners. Customary additives are also retarders such as hydroxycarboxylic acids or dicarboxylic acids or salts thereof, saccharides, oxalic acid, succinic acid, tartaric acid, gluconic acid, citric acid, sucrose, glucose, fructose, sorbitol, and pentaerythritol. A customary additive is setting accelerators, for example alkali metal or alkaline earth metal salts of inorganic or organic acids. In addition, the following should also be mentioned: hydrophobing agents, preservatives, film-forming agents, dispersants, foam stabilizers, defoamers and flame retardants (for example aluminum hydroxide).

The additives are used in the customary amounts, which depend on the nature of the additive. In general, the amounts are from 0.01% to 10% by weight, in each case based on the total weight of the building material dry formulations.

The building material dry formulations are generally produced by mixing and homogenizing one or more hydraulically-setting binders, one or more fillers, one or more polymer powders, and optionally one or more additives to form a dry mixture. The production of the building material dry formulations can take place in a conventional manner in conventional devices. The amount of water required to process the building material dry formulations is normally added immediately before application.

The building material dry formulations are suitable, for example, for the production of reinforcing compounds for thermal insulation composite systems, or for the production of adhesives or coating materials. Examples of adhesives are adhesives for thermal insulation panels and soundproofing panels, tile adhesives, and adhesives for bonding wood and wood-based materials. Examples of coating materials are mortars, self-leveling compounds, screeds, and plasters.

The polymer powders of vinyl acetate-ethylene and/or styrene-(meth)acrylic ester copolymers produced according to the invention surprisingly show better redispersibility in water than conventional polymer powders. The improved redispersibility of the polymer powders is manifested for example in the reduced tendency of aqueous redispersions of the polymer powders to undergo sedimentation, as shown below with reference to the examples. The improved redispersibility becomes important immediately after drying, especially after a relatively long period of storage or when stored at relatively high temperatures or relatively high atmospheric humidity, i.e. when stored in humid, warm, or even warm and humid conditions in general, such as tropical conditions. This effect is brought about in particular through the use according to the invention of the water-soluble salts according to the invention. The desiccants according to the invention also contribute thereto.

Advantageously, the polymer powders produced according to the invention can be redispersed more readily and therefore also more rapidly.

After application in building material dry formulations, the polymer powders produced according to the invention ultimately give rise to hardened building products that have advantageous mechanical properties, for example tensile bond strength, flexural strength or flexibility, and also show high adhesion to substrates.

The examples that follow serve to further illustrate the invention.

EXAMPLE 1

Production of the Polymer Powders:

An aqueous dispersion of a vinyl acetate-ethylene copolymer (glass transition temperature Tg: 17° C.) stabilized with 10% by weight of polyvinyl alcohol (degree of hydrolysis: 88 mol %, Höppler viscosity: 4 mPas in a 4% aqueous solution) was treated with 2.0% by weight, based on the polymer content of the dispersion (solid/solid), of a partially hydrolyzed polyvinyl alcohol (degree of hydrolysis: 88 mol %; Höppler viscosity: 4 mPas in a 4% aqueous solution) and 6.0% by weight, based on the polymer content of the dispersion (solid/solid), of a partially hydrolyzed polyvinyl alcohol (degree of hydrolysis: 88 mol %; Höppler viscosity: 13 mPas in a 4% aqueous solution)

and also with sodium sulfate ($Na_2SO_4$) in the amount specified in Table 1 and dried by spray drying in a manner conventional per se, at an entry temperature of 130° C. and an exit temperature of 80° C., to obtain a redispersible powder. To the polymer powder was added 4% by weight of kaolin and 16% by weight of calcium carbonate as anticaking agents.

Determination of the sedimentation behavior (TS=tube sedimentation) of the polymer powder:

The sedimentation behavior of the aqueous redispersion of the polymer powder serves as a measure of the redispersibility and thus of the storage stability of the polymer powder.

The respective polymer powder obtained in example 1 was converted into an aqueous redispersion having a solids content of 50% by adding water under the action of strong shear forces.

The sedimentation behavior was determined by diluting the aqueous redispersion with water to a solids content of 0.5% and filling a graduated tube with 100 ml of this dispersion and measuring the height of the sedimented solid. The values are reported in cm of sedimentation after 24 hours. The lower the sedimentation value in the tube, the lower the coarse fraction of the redispersion and the higher the fine fraction and the better the redispersibility and storage stability of the polymer powder.

The resulting values for the sedimentation behavior (TS) are listed in Table 1.

TABLE 1

| Na$_2$SO$_4$ content of the polymer powders and sedimentation (TS) test result: | | |
|---|---|---|
| | Na$_2$SO$_4$ content of the polymer powder [% by weight]$^{a)}$ | Sedimentation[cm] |
| Comparative polymer powder 1 | 0 | 1.4 |
| Polymer powder 2 | 1 | 0.9 |
| Polymer powder 3 | 2 | 0.6 |

$^{a)}$% by weight of Na$_2$SO$_4$ based on the polymer content of the dispersion (solid/solid)

For a comparison, the sedimentation behavior (TS) of (comparative) polymer powders 1 to 3 was determined as described above, with the difference that the respective polymer powder was redispersed not in water but in $Na_2SO_4$-containing water. The $Na_2SO_4$ content of the $Na_2SO_4$-containing water was adjusted for the respective polymer powder so that for each redispersion a total $Na_2SO_4$ concentration of 0.015% by weight was obtained. The resulting values for the sedimentation behavior (TS) are shown in Table 2.

TABLE 2

| Sedimentation (TS) test result: | |
|---|---|
| | Sedimentation [cm] |
| Comparative polymer powder 1 | 1.7 |
| Polymer powder 2 | 1.1 |
| Polymer powder 3 | 0.7 |

The test results in Tables 1 and 2 show that the addition of sodium sulfate to the redispersion adversely affects the sedimentation behavior.

Surprisingly, the introduction of sodium sulfate into the polymer powders was found to improve the sedimentation behavior and thus the redispersibility and storage stability of the polymer powders, as can be seen from Table 1.

COMPARATIVE EXAMPLE 2

Comparative example 2 was carried out identically to example 1, the sole difference being that, instead of sodium sulfate, the respective amount of sodium carbonate ($Na_2CO_3$) specified in Table 3 was added to the aqueous dispersion. The test results for the sedimentation behavior (TS) are also given in Table 3.

TABLE 3

| $Na_2CO_3$ content of the polymer powders and sedimentation (TS) test result: | | |
|---|---|---|
| | $Na_2CO_3$ content of the polymer powder [% by weight][a] | Sedimentation[cm] |
| Comparative polymer powder 4 | 0 | 1.4 |
| Comparative polymer powder 5 | 1 | 1.1 |
| Comparative polymer powder 6 | 2 | 1.3 |

[a]% by weight of $Na_2CO_3$ based on the polymer content of the dispersion (solid/solid)

EXAMPLE 3

Example 3 was carried out identically to example 1, the sole difference being that the vinyl acetate-ethylene copolymer had a glass transition temperature Tg of −15° C. The test results for the sedimentation behavior (TS) are also given in Table 4.

TABLE 4

| $Na_2SO_4$ content of the polymer powders and sedimentation (TS) test result: | | |
|---|---|---|
| | $Na_2SO_4$ content of the polymer powder [% by weight][a] | Sedimentation[cm] |
| Comparative polymer powder 7 | 0 | 2.0 |
| Polymer powder 8 | 1 | 1.1 |
| Polymer powder 9 | 2 | 1.0 |

[a]% by weight of $Na_2SO_4$ based on the polymer content of the dispersion (solid/solid)

The polymer powders from example 3 were additionally stored for two weeks in an open container at 35° C. and 75% atmospheric humidity. The sedimentation behavior (TS) was then determined as described for example 1. The test results are given in Table 5.

TABLE 5

| $Na_2SO_4$ content of the polymer powders and sedimentation (TS) test result: | | |
|---|---|---|
| | $Na_2SO_4$ content of the polymer powder [% by weight][a] | Sedimentation[cm] |
| Comparative polymer powder 7 | 0 | 3.8 |
| Polymer powder 8 | 1 | 2.4 |
| Polymer powder 9 | 2 | 1.8 |

[a]% by weight of $Na_2SO_4$ based on the polymer content of the dispersion (solid/solid)

EXAMPLE 4

Example 4 was carried out identically to example 1, the sole difference being that a styrene-n-butyl acrylate copolymer having a glass transition temperature Tg of 20° C. was used instead of the vinyl acetate-ethylene copolymer.

The test results for the sedimentation behavior (TS) are also given in Table 5.

TABLE 5

| $Na_2SO_4$ content of the polymer powders and sedimentation (TS) test result: | | |
|---|---|---|
| | $Na_2SO_4$ content of the polymer powder [% by weight][a] | Sedimentation[cm] |
| Comparative polymer powder 10 | 0 | 2.7 |
| Polymer powder 11 | 1 | 1.8 |
| Polymer powder 12 | 2 | 1.4 |

[a]% by weight of $Na_2SO_4$ based on the polymer content of the dispersion (solid/solid)

Examples 1, 3 and 4 show that the use according to the invention of the water-soluble salt sodium sulfate brings about a marked reduction in sedimentation in the tube and thus an improvement in the redispersibility and storage stability of the polymer powder.

This applies both directly after spray drying and after storage in a warm and humid environment, as shown by Example 3.

By contrast, the redispersibility was not significantly improved by corresponding addition of sodium carbonate (comparative example 2). The differences in sedimentation behavior found for comparative example 2 are within the range of the measurement error (±0.2). Increasing the sodium carbonate content from 1% by weight in comparative polymer powder 5 to 2% by weight in comparative polymer powder 6 in fact resulted in a deterioration in sedimentation behavior.

Preparation of Building Material Dry Formulations:

The dry mortar formulations shown below were prepared with the polymer powders obtained. The dry mortar formulations were prepared and applied in a conventional manner.

Tile Adhesive with Low Polymer Powder Content:
quartz sand 577 parts,
portland cement 400 parts,
cellulose 3 parts,
polymer powder 20 parts.

Tile Adhesive with Moderate Polymer Powder Content:
quartz sand 444 parts,
calcium carbonate 80 parts,
portland cement 350 parts,
aluminate cement 70 parts, retarder 2 parts, cellulose 4 parts, polymer powder 60 parts.

Flexible Sealing Slurry with High Polymer Powder Content:

quartz sand 300 parts, calcium carbonate 134 parts, portland cement 130 parts, aluminate cement 70 parts, lightweight filler 50 parts, finely divided silica 5 parts, fibers 5 parts, retarder 1 part, associative thickener 5 parts, polymer powder 300 parts.

The improved redispersibility of the polymer powders according to the invention makes corresponding building products having higher flexural strengths and increased flexibility accessible.

The invention claimed is:

1. A process for producing building material dry formulations, comprising:

mixing and homogenizing one or more hydraulically-setting binders, one or more fillers, one or more protective-colloid-stabilized vinyl acetate-ethylene and/or styrene-(meth)acrylic ester copolymers in the form of water-redispersible powders and optionally one or more additives to form a dry mixture;

wherein storage stability of the protective-colloid-stabilized vinyl acetate-ethylene and/or styrene-(meth)acrylic ester copolymers in the form of water-redispersible dry powders is improved by drying aqueous dispersions comprising protective-colloid-stabilized vinyl acetate-ethylene and/or styrene-(meth)acrylic ester copolymers, one or more water-soluble inorganic salts, and one or more desiccants;

wherein the one or more water-soluble inorganic salts are selected from the group consisting of alkali metal sulfates;

wherein the one or more desiccants are selected from the group consisting of polyvinyl alcohols, polyvinyl acetals, nonionic polyvinylpyrrolidones, nonionic poly (meth)acrylamides, polysaccharides and proteins; and wherein the vinyl acetate-ethylene and/or styrene-(meth) acrylic ester copolymers in the form of water-redispersible powders do not contain polyalkylene polyamine.

2. The process of claim 1, wherein the one or more water-soluble inorganic salts are selected from the group consisting of lithium sulfate, sodium sulfate, and potassium sulfate.

3. The process of claim 1, wherein the one or more water-soluble inorganic salts are sodium sulfate.

4. The process of claim 1, wherein the aqueous dispersions or the water-redispersible powders contain 0.1% to 20% by weight of the one or more water-soluble inorganic salts based on the total weight of the vinyl acetate-ethylene and styrene-(meth)acrylic ester copolymers.

5. The process of claim 1, wherein the aqueous dispersions or the water-redispersible powders contain 0.1% to 4% by weight of the one or more water-soluble inorganic salts based on the total weight of the vinyl acetate-ethylene and styrene-(meth)acrylic ester copolymers.

6. The process of claim 1, wherein the one or more desiccants are selected from the group consisting of polyvinyl alcohols, polyvinyl acetals, nonionic polyvinylpyrrolidones, nonionic poly(meth)acrylamides and proteins.

7. The process of claim 1, wherein protective colloids and the one or more desiccants are polyvinyl alcohols.

8. The process of claim 1, wherein the one or more vinyl acetate-ethylene copolymers are selected from the group consisting of copolymers of vinyl acetate with 1% to 40% by weight of ethylene; copolymers of vinyl acetate with 1% to 40% by weight of ethylene and 1% to 50% by weight of one or more further comonomers from the group of vinyl esters having 3 to 12 carbon atoms in the carboxyl radical; copolymers of vinyl acetate, 1% to 40% by weight of ethylene, and 1% to 60% by weight of acrylic esters of unbranched or branched alcohols having 1 to 15 carbon atoms; copolymers with 30% to 75% by weight of vinyl acetate, 1% to 40% by weight of ethylene, 1% to 30% by weight of vinyl laurate or vinyl esters of an alpha-branched carboxylic acid having 5 to 13 carbon atoms, and also 1% to 30% by weight of acrylic esters of unbranched or branched alcohols having 1 to 15 carbon atoms; and copolymers with vinyl acetate, 1% to 40% by weight of ethylene, and 1% to 60% by weight of vinyl chloride; and where the percentages by weight add up to 100% by weight in each case.

9. The process of claim 1, wherein the styrene-(meth) acrylic ester copolymers are based on styrene and one or more monomers from the group consisting of methyl methacrylate, methyl acrylate, ethyl acrylate, propyl acrylate, n-butyl acrylate, and 2-ethylhexyl acrylate.

10. The process of claim 1, wherein the vinyl acetate-ethylene or styrene-(meth)acrylic ester copolymers have a glass transition temperature Tg of −50° C. to +25° C.

11. The process of claim 1, wherein the vinyl acetate-ethylene or styrene-(meth)acrylic ester copolymers are produced by free-radical-initiated emulsion polymerization and that one or more water-soluble inorganic salts are added before or during the emulsion polymerization.

12. The process of claim 1, wherein the vinyl acetate-ethylene or styrene-(meth)acrylic ester copolymers are produced by free-radical-initiated emulsion polymerization and that one or more water-soluble inorganic salts are added after the emulsion polymerization and before the drying of the aqueous dispersions.

13. The process of claim 1, wherein the hydraulically-setting building material dry formulations contain 5% to 50% by weight of hydraulically-setting binders based on the total weight of the hydraulically-setting building material dry formulations.

14. The process of claim 1, wherein the hydraulically-setting building material dry formulations are used as reinforcing compounds for thermal insulation composite systems, as adhesives for thermal insulation panels or soundproofing panels, as tile adhesives, or as mortars, self-leveling compounds, screeds or plasters.

15. The process of claim 1, wherein the vinyl acetate-ethylene and/or styrene-(meth)acrylic ester copolymers in the form of water-redispersible powders contain 1% to 30% of the one or more desiccants based on the total weight of the copolymers.

16. The process of claim 1, wherein the building material dry formulations contain 0.1% to 5.0% by weight of polymer powders and 5% to 50% by weight of hydraulically-setting binders, in each case based on the total weight of the building material dry formulations.

* * * * *